United States Patent
Ida et al.

(10) Patent No.: US 7,277,677 B2
(45) Date of Patent: Oct. 2, 2007

(54) CONTROL DEVICE FOR ANTENNA MATCHING CIRCUIT

(75) Inventors: Ichirou Ida, Yokohama (JP); Jun-ichi Takada, Sagamihara (JP); Takeshi Toda, Kawasaki (JP); Yasuyuki Oishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 427 days.

(21) Appl. No.: 10/872,459

(22) Filed: Jun. 22, 2004

(65) Prior Publication Data

US 2005/0184922 A1 Aug. 25, 2005

(30) Foreign Application Priority Data

Feb. 24, 2004 (JP) .............................. 2004-048127

(51) Int. Cl.
*H04B 1/44* (2006.01)

(52) U.S. Cl. .................. 455/78; 455/83; 455/277.1; 455/101; 455/562.1; 455/575.7; 343/703; 343/864; 343/767; 343/749

(58) Field of Classification Search ................ 455/78, 455/83, 101, 272, 277.1, 562.1, 575.7, 85; 343/767, 749, 702, 860, 700 MS, 703; 324/318; 333/246, 26

See application file for complete search history.

(56) References Cited

U.S. PATENT DOCUMENTS

| | | | | |
|---|---|---|---|---|
| 5,739,792 A | * | 4/1998 | Hassemer et al. ........... | 343/702 |
| 5,801,662 A | * | 9/1998 | Itoh ............................ | 343/702 |
| 5,867,127 A | * | 2/1999 | Black et al. ................. | 343/702 |
| 5,903,820 A | * | 5/1999 | Hagstrom ..................... | 455/82 |
| 5,914,640 A | * | 6/1999 | Nasserbakht ................. | 330/294 |
| 5,969,682 A | * | 10/1999 | Ito et al. ..................... | 343/702 |
| 5,990,838 A | * | 11/1999 | Burns et al. ................. | 343/702 |
| 6,222,500 B1 | * | 4/2001 | Koitsalu et al. ............. | 343/864 |
| 6,400,336 B1 | * | 6/2002 | Gleener ....................... | 343/860 |
| 6,529,746 B1 | * | 3/2003 | Kotzin ..................... | 455/562.1 |
| 6,590,538 B1 | * | 7/2003 | Koyanagi et al. ........... | 343/702 |
| 6,697,030 B2 | * | 2/2004 | Gleener ....................... | 343/860 |
| 6,753,827 B2 | * | 6/2004 | Oshiyama et al. .......... | 343/876 |
| 6,862,432 B1 | * | 3/2005 | Kim ............................ | 455/80 |
| 7,079,816 B2 | * | 7/2006 | Khorram et al. .............. | 455/78 |
| 7,092,679 B2 | * | 8/2006 | Khorram ...................... | 455/78 |

FOREIGN PATENT DOCUMENTS

| | | |
|---|---|---|
| JP | 8-148960 | 6/1996 |
| JP | 8-195638 | 7/1996 |
| JP | 11-251928 | 9/1999 |

\* cited by examiner

*Primary Examiner*—Marceau Milord
(74) *Attorney, Agent, or Firm*—Kratz, Quintos & Hanson, LLP

(57) ABSTRACT

A control device for an antenna matching circuit is configured to output an adjusting signal for changing impedance of an element in the antenna matching circuit based on change over time in signal power ratio of a reflected signal from the antenna matching circuit to an incident signal to the antenna matching circuit.

20 Claims, 6 Drawing Sheets

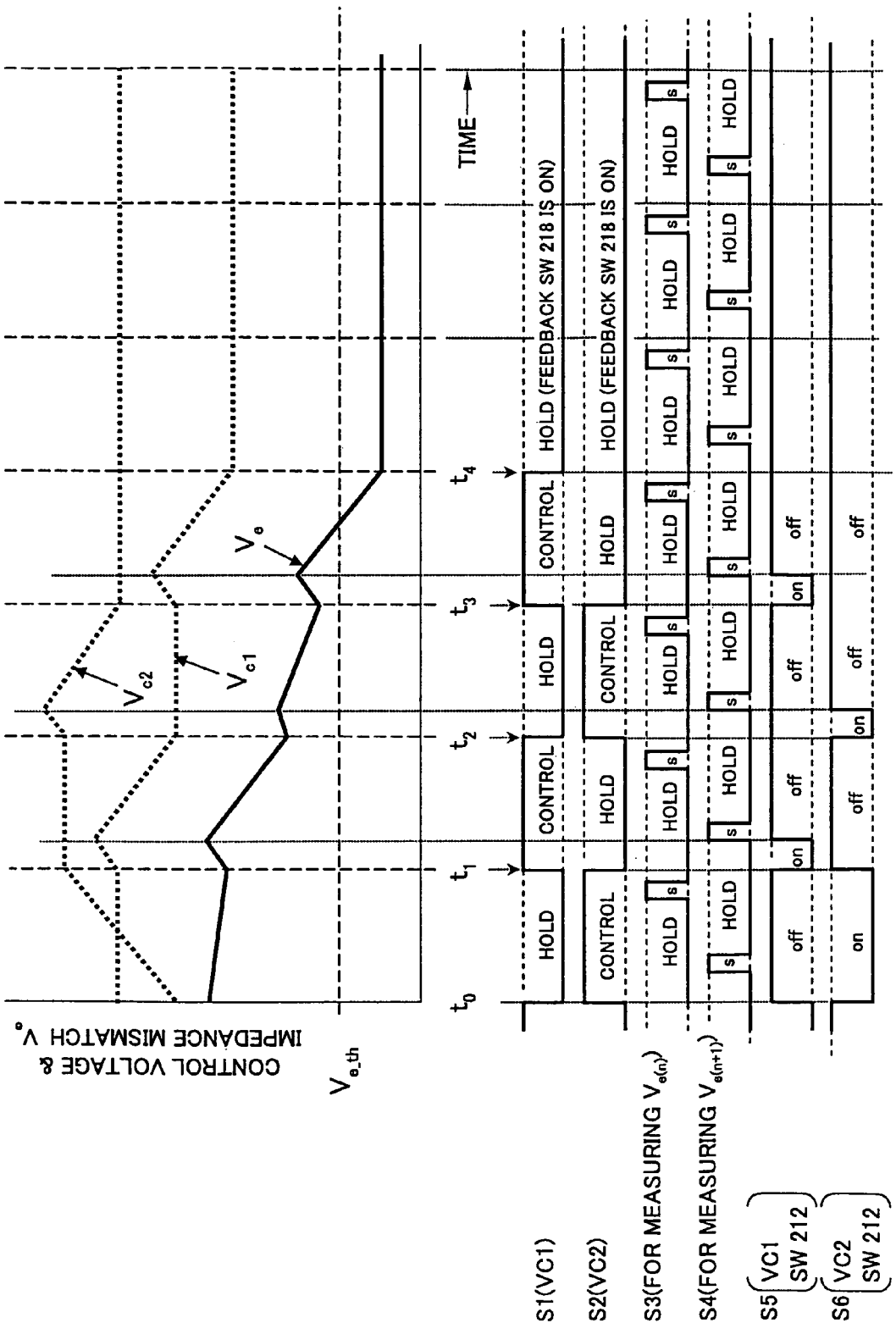

CONTROL DEVICE FOR ANTENNA MATCHING CIRCUIT

BACKGROUND OF THE INVENTION

The present invention generally relates to the technical field of wireless communication, and more particularly, to a control device for regulating the circuit constant of an antenna matching circuit.

It is necessary for radio communication equipment to implement impedance matching between the antenna and the internal circuit; otherwise, the signal energy cannot be effectively radiated from the antenna or supplied to the internal circuit.

In mobile communication, the input/output impedance of the antenna varies depending on the environment in actual use. For instance, in receiving a radio wave, the input impedance of the antenna of radio communication equipment placed on a desk differs from the input impedance of that radio communication equipment held in hand. For this reason, radio communication equipment is furnished with an a antenna matching circuit for adjusting the input impedance of the antenna so as to equal or approximate the characteristic impedances of the internal circuit and the transmission line. Such a matching circuit is structured with high-frequency variable elements (such as capacitors and coils capable of changing the impedance). By adjusting the impedances of the high-frequency variable elements, impedance matching is achieved between the antenna and the internal circuit.

Conventional matching circuits are disclosed in, for example, JPA 11-251928, JPA 8-195638, and JPA 8-148960. The matching circuit disclosed in JPA 8-148960 adjusts the impedance between only two levels, and therefore, it is difficult for this matching circuit to flexibly adjust the antenna impedance according to the status of use. The circuits disclosed in JPA 11-251928 and JPA 8-195638 are capable of adjusting the impedance of a high-frequency variable element over a broader range than that of the circuit disclosed in JPA 8-148960. However, these circuits require a dedicated digital processor for adjusting the impedance of the high-frequency variable element. To provide a dedicated digital processor, various elements, such as an analog-to-digital converter, a CPU, a digital-to-analog converter, and other necessary devices, have to be assembled and a complicated control algorithm has to be executed.

To adjust the impedances of multiple variable elements, a digital processor has to be provided for each of the variable elements. Accordingly, the techniques disclosed in JPA 11-251928 and JPA 8-195638 are unsuitable for applications for regulating multiple elements.

In addition, with the technique disclosed in JPA 11-251928, a detected signal is used as a parameter representing impedance mismatch of the antenna, which is then used as a control signal for adjusting the impedance of the high-frequency variable element. Accordingly, if the detected signal has only a small quantity of power, the response speed for controlling the high-frequency variable element becomes slow.

The above-described drawbacks in the known techniques become conspicuous when applied to mobile communications involving cellular terminals traveling at high speed or data transmission for transmitting a large quantity of data at a high rate. Such high-speed mobile communications and high-speed data transmission are important technologies attracting more and more attention. It is difficult for the conventional matching circuits to deal with these demands.

SUMMARY OF THE INVENTION

The present invention was conceived to overcome the above-described problems, and it is an object of the invention to provide a control device that can adaptively adjust the circuit constant of an antenna matching circuit.

To achieve the object, a control device for regulating an antenna matching circuit is configured to output an adjusting signal for changing the impedance of an element comprising the antenna matching circuit based on change over time in the ratio of a reflected signal power from the antenna matching circuit to an incident signal power to the antenna matching circuit.

With this arrangement, the circuit constant of the antenna matching circuit can be adaptively adjusted depending on the circumstances and the environment.

BRIEF DESCRIPTION OF THE DRAWINGS

Other objects, features, and advantages of the present invention will become more apparent from the following detailed description when read in conjunction with the accompanying drawings, in which:

FIG. 6 is a timing chart showing still another example of control timing of signals, together with the control scheme of the controller.

DESCRIPTION OF THE PREFERRED EMBODIMENTS

The preferred embodiments of the invention are next described with reference to the accompanying drawings.

Figure 1:
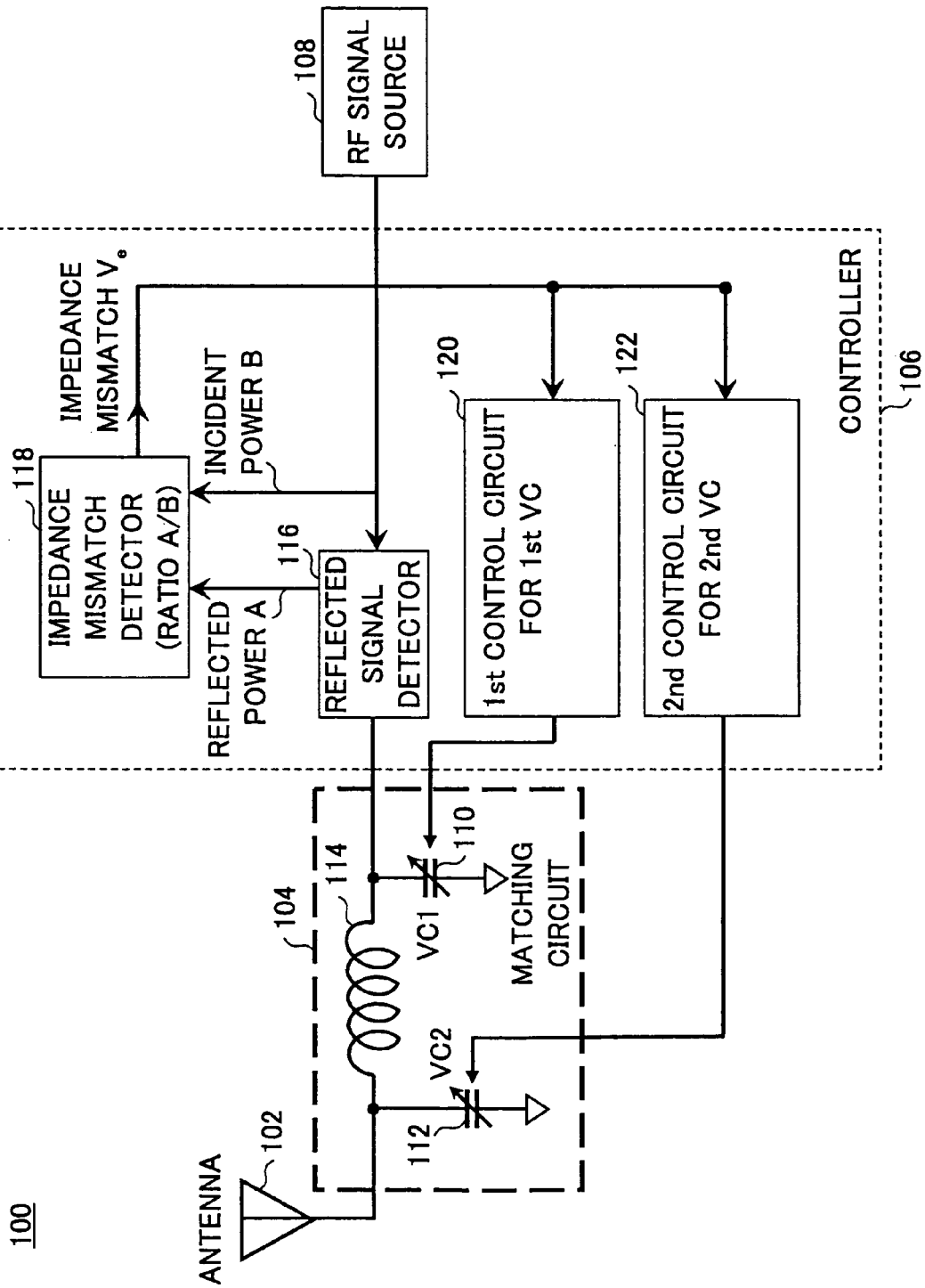
FIG. 1 is a block diagram illustrating a part of a radio communication equipment set, which includes a controller for an antenna matching circuit according to an embodiment of the invention.

FIG. 1 is a block diagram illustrating a part of a radio communication equipment set having a control device for an antenna matching circuit, according to an embodiment of the invention. The radio communication equipment 100 includes an antenna 102, an antenna matching circuit 104, a controller 106, and an RF signal source 108. The matching circuit 104 has a first varactor capacitor (a capacitor using a varactor diode) 110, a second varactor capacitor 112, and a coil 114. The controller 106 has a reflected signal detector 116, an impedance mismatch detector 118, a first controlling circuit 120 for controlling the first varactor capacitor 110, and a second controlling circuit 122 for controlling the second varactor capacitor 112.

The matching circuit 104 implements impedance matching between the antenna and other processing circuits in the radio communication equipment by changing the capacitances of the first and second varactor capacitors 110 and 112. In the example shown in FIG. 1, the coil 114 is connected in series with the antenna 102, and the first and second varactor capacitors 110 and 112 are connected in parallel one on each side of the coil 114. The inductance of the coil 114 is fixed. The present invention is not limited to this example, and is applicable to any matching circuit having a high-frequency variable element.

The RF signal source 108 outputs, for example, a transmission signal, and the input impedance of the antenna 102 has to be adjusted by the matching circuit 104 so as to equal or approximate the circuit impedance of the RF signal source 108.

The reflected signal detector 116 of the controller 106 detects a reflected component of the signal input to the matching circuit 104. The reflected signal detector 116 is, for example, a directional coupler.

The impedance mismatch detector 118 estimates a signal ratio of power A of the reflected signal detected by the reflected signal detector 116 (which is referred to as a "reflected power A") to power B of the signal input to the matching circuit 104 (which is referred to as an "incident power B"). The impedance mismatch detector 118 then outputs the signal ratio A/B as impedance mismatch Ve.

Here, consideration is made of the level representing the impedance mismatch of an antenna. If the input impedance of the antenna matches the characteristic impedance of the internal circuit, reflected power A becomes small. If impedance match is not achieved between the antenna and the internal circuit, then reflected power A becomes large. Accordingly, a quantity defined in proportion to reflected power A can be associated with the impedance mismatch.

On the other hand, the level of the reflected power A may change according to the level of the incident power B, independently from the impedance mismatch. In this case, the reflected signal becomes large if a relatively large signal is input to the matching circuit 104, and it becomes small if a relatively small signal is input to the matching circuit 104. Taking into account both relations, the quantity Ve representing the impedance mismatch is defined as the signal ratio A/B in this embodiment.

The first control circuit 120 for the first varactor capacitor 110 outputs a first adjusting signal VC1 for setting the capacitance of the first varactor capacitor 110, according to change over time in impedance mismatch Ve. The second control circuit 122 for the second varactor capacitor 112 outputs a second adjusting signal VC2 determining the capacitance of the second varactor capacitor 112, according to the change over time in impedance mismatch Ve. The first and second control circuits 120 and 122 have the same circuit structure and operate in the same manner. The details of the circuit structure and the operation of the control circuit 120 are described with reference to FIGS. 2 and 3, which description similarly applies to the control circuit 122, except for some symbols.

It should be noted that in this embodiment the impedances of two high-frequency variable elements 110 and 112 of the matching circuit 104 are adjusted, and therefore, two control systems 120 and 122 are used. If only a single variable element is impedance-adjusted, the second control system is unnecessary. If impedances of three variable elements are adjusted, then a third control system is required. In general, as many control circuits are required as the number of variable elements.

Figure 2:
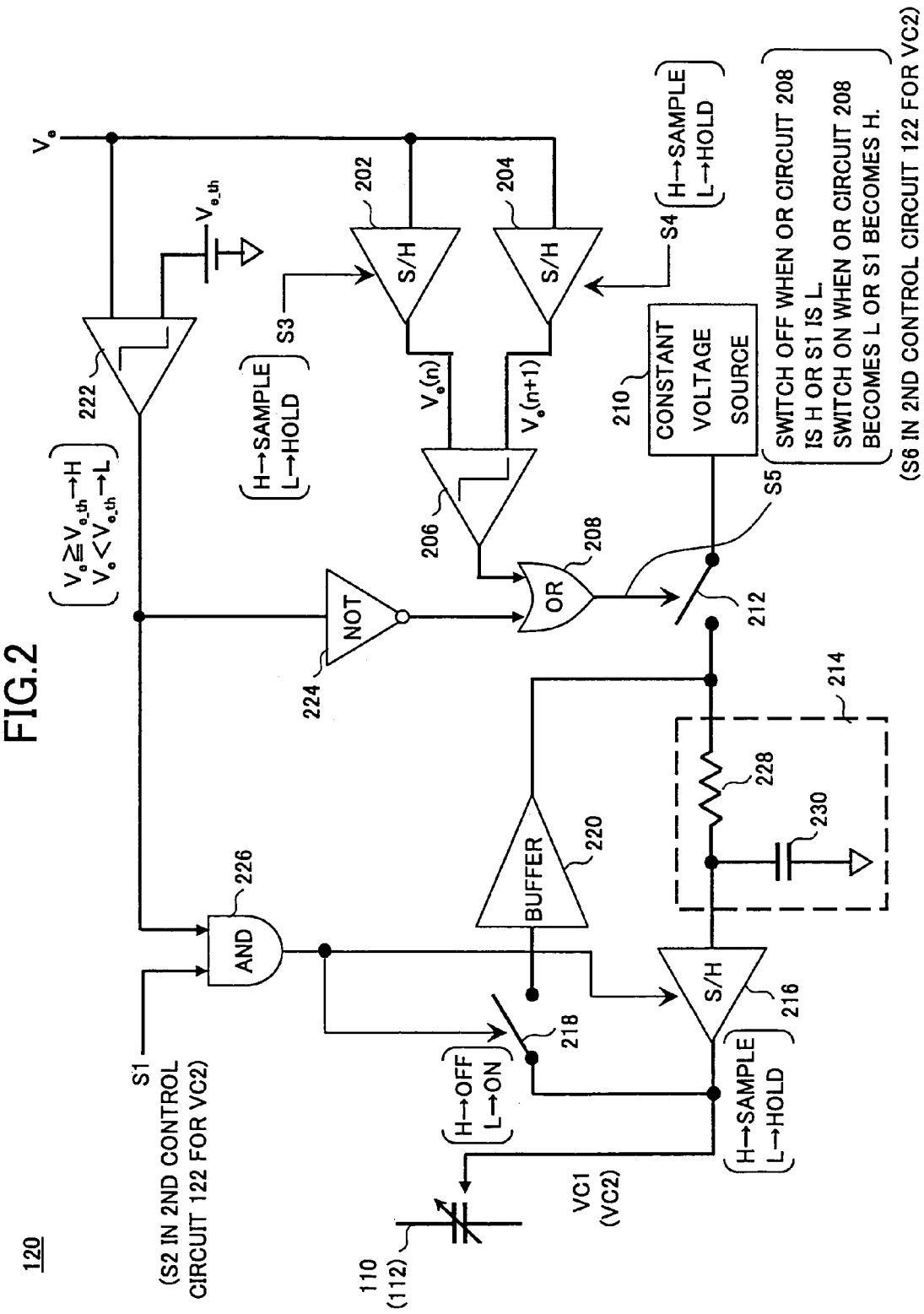
FIG. 2 is a circuit diagram illustrating the detailed structure of the controller for the antenna matching circuit.

FIG. 2 is a circuit diagram of the first control circuit 120 for the first varactor capacitor 110. Since the second control circuit 122 for the second varactor capacitor 112 has the same structure, illustration and explanation are omitted. For better understanding, explanation is made using two-level signals H (logical high) and L (logical low) in the following description; however, other schemes using binary signals may be used.

The control circuit 120 includes a first sample-and-hold circuit 202 for sampling impedance mismatch Ve at time n, a second sample-and-hold circuit 204 for sampling impedance mismatch Ve at time n+1, an impedance mismatch comparator 206, and an OR gate (OR circuit) 208. The control circuit 120 also includes a constant voltage source 210, a switch 212, a time constant circuit 214, an adjusting signal sample-and-hold circuit 216, a switch 218, and a buffer 220. The control circuit 120 further includes a threshold comparator 222, an inverter 224, and an AND gate (AND circuit) 226. The time constant circuit 214 has a resistor 228 and a capacitor 230.

The first sample-and-hold circuit 202 samples and holds the detected impedance mismatch Ve in response to control signal S3. To be more precise, the first sample-and-hold circuit 202 implements sampling when the control signal S3 is at a High level, and holds the sampled value when the control signal S3 is at a Low level. The second sample-and-hold circuit 204 samples and holds the detected impedance mismatch Ve in response to control signal S4, implementing sampling when the control signal S4 is at a High level and holding the sampled value when the control signal S4 is at a Low level. As is illustrated in a timing chart shown in FIG. 4, which will be explained below, the first sample-and-hold circuit 202 samples and holds the impedance mismatch Ve(n) at time n, and the second sample-and-hold circuit 202 samples and holds the impedance mismatch Ve(n+1) at the next timing. The sampled impedance mismatches may be expressed as Ve(t) and Ve(t+τd).

The impedance mismatch comparator 206 compares Ve(n) and Ve(n+1) supplied from the first and second sample-and-hold circuits 202 and 204, and outputs a two-level signal according to the change over time in the detected impedance mismatch.

The threshold comparator 222 compares impedance mismatch Ve with a prescribed threshold value Ve_th, and outputs the comparison result as a two-level signal. In this example, the threshold comparator 222 outputs a H-level signal if Ve≧Ve_th, and outputs a L-level signal if not.

The inverter 224 outputs an inverted signal of the two-level signal output from the threshold comparator 222. The OR gate 208 outputs the logical sum of the output of the impedance mismatch comparator 206 and the output of the inverter 224.

The ON/OFF operation of the switch 212 is controlled by control signal S5, which is the output of the OR gate 208 in order to supply or not to supply power from the constant voltage source 210 to the time constant circuit 214. If the control signal S5 is at a High level, the switch 212 is opened (switched off), and it is closed (switched on) when S5 is at a Low level.

When the time constant circuit 214 is connected to the constant voltage source 210 via the closed switch 212, the time constant circuit 214 outputs a gradually augmenting adjusting signal VC1 in response to the accumulation of electric charge in the capacitor 230. When the time constant circuit 214 is disconnected from the constant voltage source 210 by the opened switch 212, the time constant circuit 214 outputs a gradually decaying signal VC1 in response to discharge of the electric charge from the capacitor 230. The capacitance of the varactor capacitor 110 is appropriately controlled (increased or reduced) by the augmenting or decaying adjusting signal VC1. The structure of the time constant circuit 214 is not limited to the example illustrated in FIG. 2, and an arbitrary circuit structure can be employed as long as a signal with an increasing or decreasing level is output in response to connection with and disconnection from the constant voltage source 210. From the viewpoint of the simplification of the structure, the charging/discharging circuit illustrated in FIG. 2 is preferable.

The adjusting signal sample-and-hold circuit 216 holds the level of the adjusting signal VC1 during a prescribed period. In this holding period of VC1, the signal level of another adjusting signal VC2 varies in order to change the capacitance of the second varactor capacitor 112. As will be described below, when the impedance mismatch Ve exceeds the threshold value, the adjusting signal VC1 can be held constant.

AND gate 226 outputs a logical product of control signal S1 (corresponding to VC1) and the comparison result from the threshold comparator 222. The output signal from the AND circuit 226 becomes a control signal for controlling the adjusting signal sample-and-hold circuit 216. In this example, when the output signal from the AND gate 226 is at the High level, sampling is carried out. When the output signal from the AND gate 226 is at the Low level, holding is carried out.

The switch 218 and the buffer 220 form a feedback loop for feeding the output of the time constant circuit 214 back to the input thereof. The switch 218 is opened and closed according to the output signal from the AND gate 226. In this example, when the output signal from the AND gate 226 is at the High level, the switch 218 is turned off (opened), while it is turned on (closed) when the output signal is at the Low level. In other words, when the adjusting signal sample-and-hold circuit 216 is sampling the adjusting signal VC1, the switch 218 is opened. When the sample-and-hold circuit 216 is holding the adjusting signal, the switch 218 is closed.

To consider the meaning of the feedback loop, assumption is made as if there is no feedback loop with the switch 218 and the buffer 220. In this case, if the output of the time constant circuit 214 is held by the sample-and-hold circuit 216 and if the time constant circuit 214 is disconnected from the constant voltage source 210, then the input voltage to the time constant circuit 214 decreases rapidly. Then, when the sample-and-hold circuit 216 resumes sampling, the adjusting signal VC1 changes abruptly from the holding level to the low level and the control operation may become unstable. If the constant voltage source 210 is connected to the time constant circuit 214 during the holding period of the sample-and-hold circuit 216, the capacitor 230 is charged up to the level of the constant voltage source 210. In this state, when the sample-and-hold circuit 216 resumes sampling, the adjusting signal VC1 changes abruptly from the holding level to the high level. To avoid such unstable operations, the time constant circuit 214 is disconnected from the constant voltage source 216 during the holding period of the sample-and-hold circuit 216, and in addition, a feedback loop is provided in this embodiment.

Although in this example the first and second sample-and-hold circuits 202 and 204, the impedance mismatch comparator 206, and the threshold comparator 222 are provided to each of the control circuits 120 and 122, a portion or all of these components may be shared between the control circuits 120 and 122.

Figure 3:
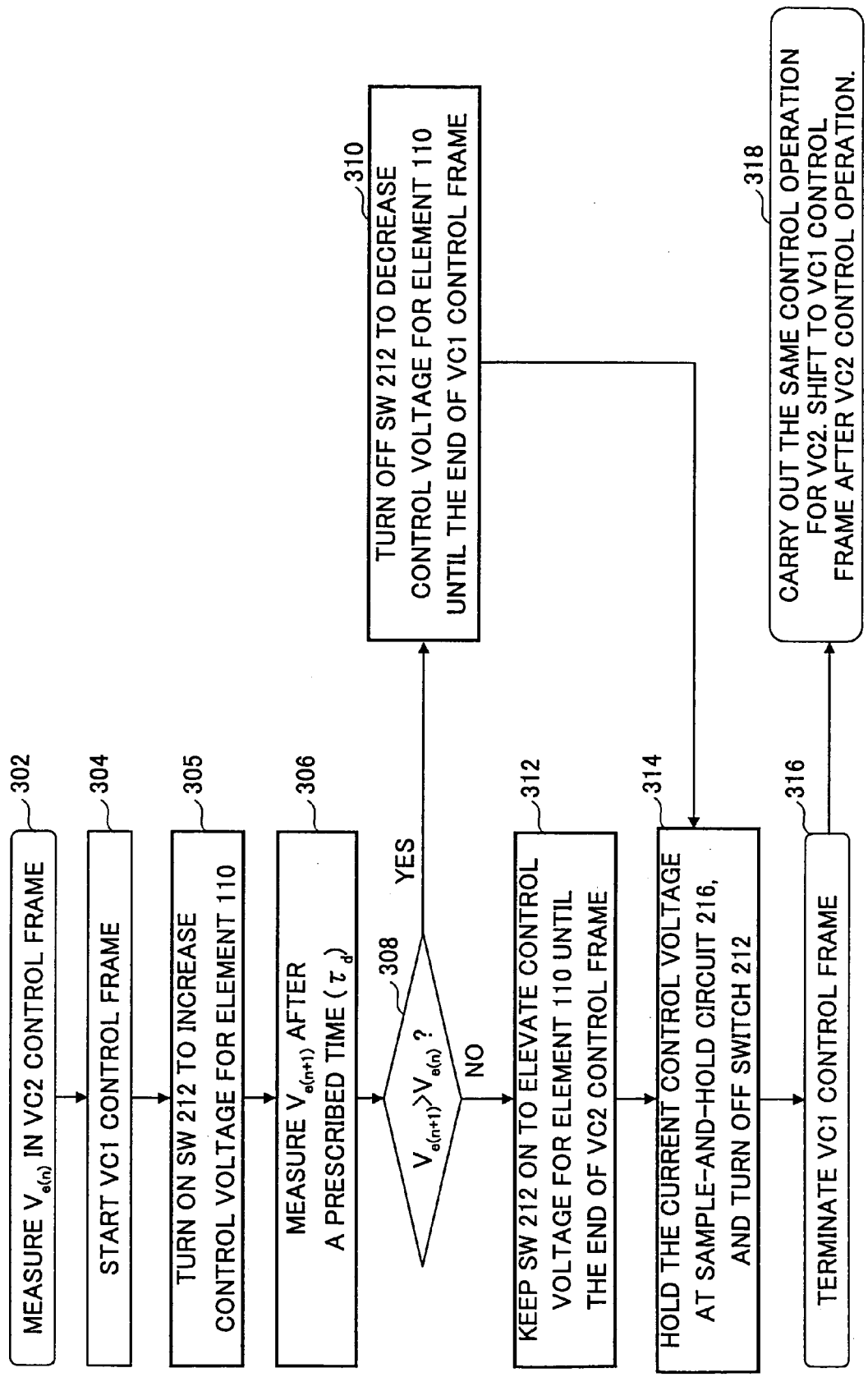
FIG. 3 is a flowchart showing the operation of the controller.

FIG. 3 is a flowchart showing the operation of the control circuit. In this embodiment, the two high-frequency variable elements 110 and 112 are controlled alternately. In a certain time frame, the impedance of one of the variable elements is changed, while the impedance of the other variable element is maintained constant. In the next time frame, the impedance of the other variable element is maintained constant, while changing the impedance of said one variable element. The alternation is repeated. This method can be expanded to the application where three or more variable elements are controlled. In this case, for N high-frequency variable elements, N time frames are repeated. In each time frame, the impedance of one variable element is changed, while the impedances of the other (N−1) variable elements are maintained constant. In this manner, all the variable elements are adjusted one by one.

In step S302, impedance mismatch Ve(n) is measured at a certain point of time in the VC2 control frame for adjusting the second high-frequency variable element 112. The measurement is carried out by the first sample-and-hold circuit 202.

In step S304, the VC2 control frame is finished, and VC1 control frame for adjusting the first high-frequency variable element 110 starts. The impedance of the second high-frequency variable element 112 is maintained constant until the VC1 control is finished. During the VC1 control frame, control signal S1 is at the High level. Accordingly, if the detected impedance mismatch Ve is greater than the threshold level Ve_th (Ve>Ve_th), the output signal from the AND gate becomes high level. In this case, the output level of the time constant circuit 214 is sampled and output as the adjusting signal VC1 to change the impedance of the high-frequency variable element 110.

In step S305, upon shifting to the VC1 control frame, switch 212 is turned on to connect the time constant circuit 214 to the constant voltage source 210. As a result, the control voltage (of the adjusting signal VC1) for the high-frequency variable element 110 is elevated.

In step S306, impedance mismatch Ve(n+1) is measured after a prescribed time period τd. This measurement is made at the second sample-and-hold circuit 204.

In step S308, change over time in impedance mismatch is examined by comparing the current impedance mismatch Ve(n+1) with the previous impedance mismatch Ve(n). If Ve(n+1) is greater than Ve(n) (YES in S308), it is regarded that the controlling direction of the adjusting signal VC1 set in step S304 (that is, increasing direction of the adjusting signal in this example) is inappropriate. Then, the process proceeds to step S310.

In step S310, the switch 212 is turned off in response to the level change of the output signal from the impedance mismatch comparator 206. In this case, the output signal of the comparator 206 becomes High due to the fact that the current impedance mismatch Ve(n+1) exceeds the previous impedance mismatch Ve(n) (Ve(n+1)>Ve(n)). The impedance mismatch comparator 206 output a Low signal if Ve(n+1)≦Ve(n). By turning off the switch 212, the control voltage (of the adjusting signal) for the high-frequency variable element 110 is reduced until the end of the VC1 control frame.

If the current impedance mismatch Ve(n+1) is at or below the previous impedance mismatch Ve(n) (Ve(n+1)≦Ve(n)) in step S308, then the process proceeds to step S312. In this case, the control direction for impedance change carried out in step S304 (i.e., increasing direction of the adjusting signal) is appropriate. Therefore, in step S312, the switch 212 is maintained in the ON state to continuously increase the control voltage for element 110 until the end of the VC1 control frame.

In step S314, the current control voltage is maintained at the sample-and-hold circuit 216 immediately before the termination of the VC1 control frame, and switch 212 is opened.

In step S316, the VC1 control frame is finished. Then, in step S318, the VC2 control frame starts and the same process is repeated to adjust the impedance of the other variable element 112. After the VC2 control frame is again repeated the VC1 control frame. In this manner, the impedances of the variable elements 110 and 112 are adjusted alternately.

In the above-described example, the signal level supplied to the varactor is increased for a period of time τd at the beginning of each frame in order to determine whether or not this control direction is correct. However, the invention is not limited to this example. The adjusting signal may be decreased for a predetermined period, and then Ve(n) and Ve(n+1) may be compared to determine the appropriateness of the control direction. Furthermore, the control direction may be set alternately to the increasing direction and the decreasing direction.

Figure 4:
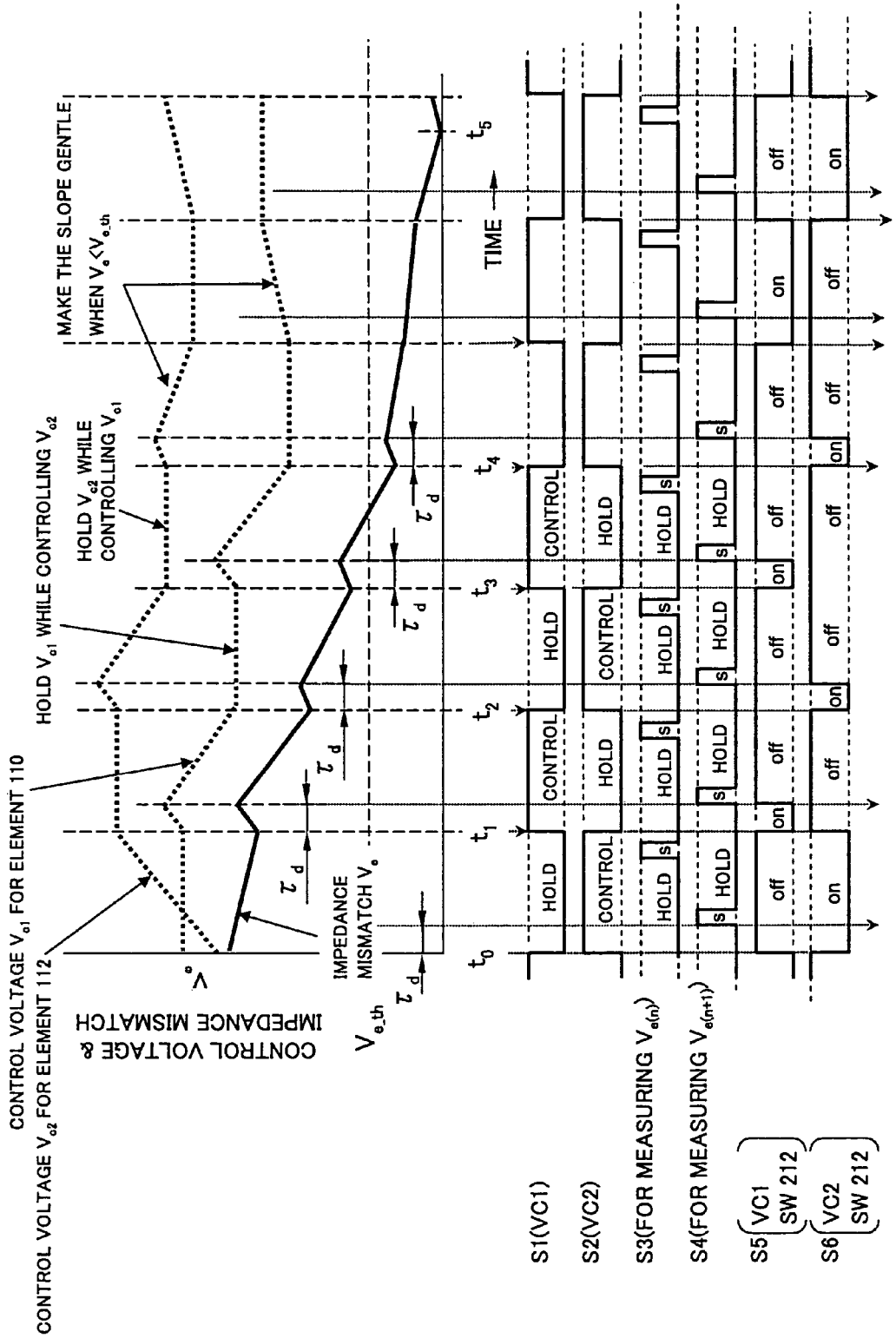
FIG. 4 is a timing chart showing an example of control timing of signals, together with the control scheme of the controller.

FIG. 4 is a timing chart showing an example of control timing of signals (the lower half of FIG. 4), together with the control scheme of the controller (the upper half of FIG. 4). The horizontal axis represents time (t), and the vertical axis represents control voltage VC1 (or VC2) and impedance mismatch Ve. The broken lines indicate control voltage VC1 for the high-frequency variable element 110 and control voltage VC2 for the high-frequency variable elements 112, respectively. The solid line indicates impedance mismatch Ve. During the period in which the control voltage VC1 is being changed (e.g., t1-t2 or t3-t4), the control voltage VC2 is maintained constant. Similarly, during the period in which the control voltage VC2 is being changed (e.g., t0-t1 or t2-t3), the control voltage VC1 is maintained constant. In this example, when the impedance mismatch Ve becomes smaller than the threshold level Ve_th (at or after t4), the time constant of the time constant circuit 214 is increased in order to make the rate of change of the impedance (that is, the slopes of the control signals VC1 and VC2) gentle for more precise control.

Next, explanation is made of signal control with reference to the timing chart of FIG. 4 and the circuit diagram of FIG. 2 as necessary.

Period t0-t1 is a VC2 control frame. In this period, control signal S1 is at a Low level (holding level), and control signal S2 is at a High level (control level). The impedance of the variable element 110 is maintained constant in the holding state, while the impedance of the variable element 112 is varied in the control state. Period t1-t2 is a VC1 control frame. In this period, control signal S1 is controlled (in the control state) and control signal S2 is maintained (in the holding state).

Control signal S3 rises immediately before time t1 to cause the first sample-and-hold circuit 202 to sample the impedance mismatch Ve(n), and then falls to cause the sample-and-hold circuit 202 to hold the sampled value and supplies it to one of the input terminals of the impedance mismatch comparator 206.

At time t1, the control signal S1 becomes the control level (H level). In response to this change, the sample-and-hold circuit 216 starts sampling, and supplies the output value of the time constant circuit 214 as the adjusting signal (or the control voltage) VC1 to the variable element 110. At this time, the switch 212 is turned on. Accordingly, the control voltage VC1 is increasing.

When time τd has passed since time t1, control signal S4 rises from the holding level to the sampling level "s". In response to this sampling pulse, the second sample-and-hold circuit 204 samples the impedance mismatch Ve(n+1), and then holds and supplies it to the other input terminals of the impedance mismatch comparator 206. In this short period of τd, the control voltage VC1 increases tentatively. Whether or not this provisionally determined control direction (increasing direction) is appropriate is determined after time τd, based on the output from the impedance mismatch comparator 206. In the example shown in FIG. 4, not only the control voltage VC1, but also the impedance mismatch Ve increases from t1 to t1+τd, as indicated by the solid line. This means that the provisionally determined control direction is inappropriate.

Since Ve(n)<Ve(n+1) in this example, the impedance mismatch comparator 206 outputs a High-level signal. In addition, since the detected impedance mismatch Ve is greater than the threshold Ve_th, the output of the inverter 224 is at the Low level. Consequently, the OR gate 208 outputs a High-level signal, which causes the switch 212 to open. The time constant circuit 214 is disconnected from the constant voltage source 210, and the capacitor 120 start discharging. As a result, the control voltage VC1 decreases to correct the provisionally determined control direction of increasing VC1. Along with this correction, the impedance mismatch Ve also decreases after the switch 212 is turned off until time t2.

If the output of the impedance mismatch comparator 206 is Low, as in period from t0 to τd shown in FIG. 4, the control direction of increasing the control voltage is appropriate, and therefore, the switch 212 is continuously closed so as to allow the control voltage to increase.

At time t2, the VC1 control frame is finished. At this point of time, if control signal S5 is at the Low level, the signal level of S5 is raised forcibly to turn off the switch 212. Since in the example shown in FIG. 4 the control signal S5 is at the High level at t2, the switch 212 is continuously opened.

When the VC1 control frame is finished, control signal S1 shifts from the control level (High level) to the holding level (Low level), and the output of the AND gate 226 becomes Low. The sample-and-hold circuit 216 becomes the holding state to fix the control voltage VC1. As has been explained above, if the input voltage decreases too much, the control voltage VC1 is greatly reduced at the beginning of the next frame, and the operation may become unstable until the capacitor 230 is recharged. To prevent the input voltage to the time constant circuit 214 from falling excessively, the voltage held at the sample-and-hold circuit 216 is fed back to the input of the time constant circuit 214 when the switch 218 is turned on.

Period t2-t3 is a VC2 control frame, and the above-described operation for the variable element 110 is carried out for the other variable element 112.

If the impedance mismatch Ve becomes smaller then the threshold Ve_th in the middle of the period from t3 to t4, the time constant of the time constant circuit 214 is increased in this example. By changing the time constant to a larger value, the rate of change or the slope of the control voltage VC1 (or VC2) becomes gentle. As illustrated in FIG. 4, the slope of the control signal is gentle after time t4, as compared with the state before time t4. To increase the time constant, the capacitance of the capacitor 230 is increased, or connection is switched to another capacitor with a larger capacitance.

The time constant may be changed to a larger value upon detection of the fact that Ve becomes smaller than Ve_th. However, the time constant may be changed in the next frame because the controlling direction is assumed to be correct since it is determined based on the change over time in impedance mismatch when time τd has passed since the beginning of each control frame. Even if the detected impedance mismatch becomes smaller than the threshold value, the impedance can be continuously changed in the same direction with the same slope, without changing the time constant, because it is assumed that the impedance mismatch will reach a further smaller value.

Figure 5:
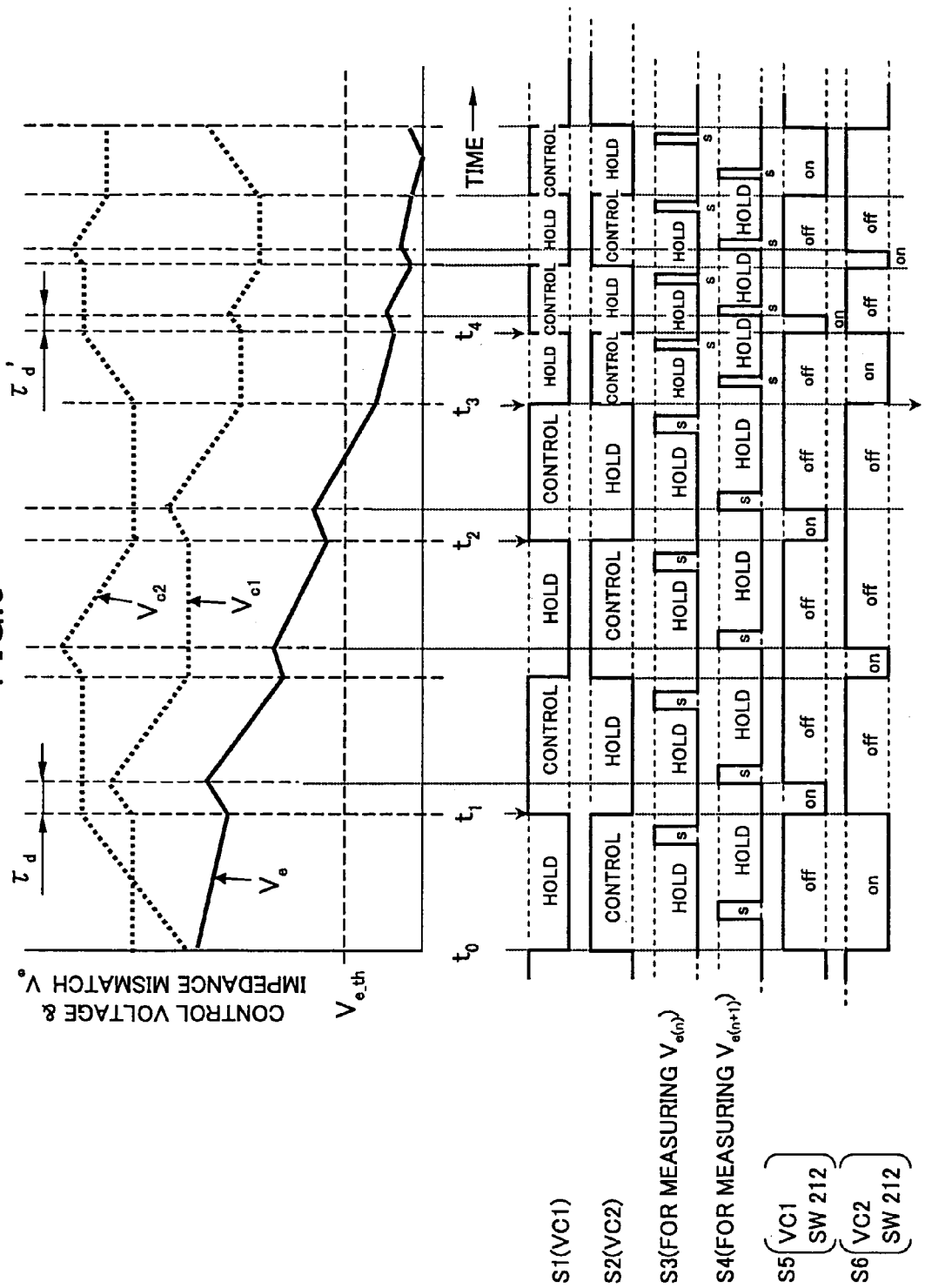
FIG. 5 is a timing chart showing another example of control timing of signals, together with the control scheme of the controller.

FIG. 5 is a timing chart showing another example of control timing of signals (the lower half of FIG. 5), together with the control scheme of the controller (the upper half of FIG. 5). The operation carried out until the impedance mismatch Ve becomes smaller than the threshold Ve_th is the same as that shown in FIG. 4, and therefore, explanation for it is omitted. Once the impedance mismatch becomes smaller than the threshold Ve_th, the timing clock given to the controller is switched to a faster one. Consequently, the impedance mismatch is measure more frequently, and the VC1 control frame and the VC2 control frame become shorter. In this example, impedance is adjusted to the optimum value more precisely by increasing the frequency of determination of the control direction of the control voltage when the impedance mismatch Ve becomes smaller than the threshold Ve_th. Two types of timing clocks, namely, a faster one and a slower one are prepared, and the faster timing clock is selected when the impedance mismatch Ve becomes smaller than the threshold Ve_th.

When it is detected that the impedance mismatch becomes smaller than the threshold Ve_th (in the middle of the period between t2 and t3 in this example), the timing clock may be immediately switched to the faster one. However, as in the example shown in FIG. 4, it is assumed that the control direction at the point of time when the impedance mismatch reaches the threshold level is correct. Accordingly, the impedance mismatch continuously decreases as long as the voltage control is carried out in the same direction even after the impedance mismatch becomes smaller than the threshold level. Therefore, it is preferable to change the timing clock in the next frame (starting from time t3).

From the viewpoint of searching for the optimum impedance more efficiently, the control scheme shown in FIG. 4 may be combined with that shown in FIG. 5.

FIG. 6 is a timing chart showing another example of control timing of signals (the lower half of FIG. 6), together with the control scheme of the controller (the upper half of FIG. 6). The operation carried out until the impedance mismatch Ve becomes smaller than the threshold Ve_th is the same as that shown in FIG. 4, and accordingly, explanation for it is omitted. In the example shown in FIG. 6, control voltages VC1 and VC2 are maintained constant once the impedance mismatch Ve becomes smaller than the threshold Ve_th. To be more precise, when the impedance mismatch Ve becomes smaller than the threshold Ve_th in the middle of time t3, the output of the threshold comparator 222 changes from the High level to the Low level, and consequently, the output of the inverter 224 changes from the Low level to the High level. The output of the OR gate 208 becomes High level regardless of the output value from the impedance mismatch comparator 206, and the switch 212 is turned off. In addition, since the output of the threshold comparator 222 changes from the High level to the Low level, the output of the AND gate 226 becomes the Low level, which causes the sample-and-hold circuit 216 to be in the holding state, while causing the switch 218 to be turned on.

This arrangement allows the processing work load of the controller to be greatly reduced after the impedance mismatch Ve becomes smaller than the threshold Ve_th. Upon the detection of the impedance mismatch Ve that has become smaller than the threshold Ve_th in the middle of period between t3 and t4, the control voltage can be immediately held. As in the examples shown in FIG. 4 and FIG. 5, it is assumed that the control direction at the point of time when the impedance mismatch Ve has reached the threshold level Ve_th is correct, and that the impedance mismatch will be further decreased even after it becomes smaller than the threshold value as long as the voltage control direction is the same. Accordingly, the timing clock may be changed in the next frame (starting from time t4).

There are many advantages in the embodiment of the present invention. For instance, since the impedance mismatch Ve is determined based on the ratio of the reflected power to the incident power to the antenna matching circuit 104, the impedance mismatch for the antenna can be known accurately. Based on change over time in the signal power ratio (i.e., the impedance mismatch), the adjusting signal for regulating the impedance of the high-frequency variable element of the antenna matching circuit 104 is generated. The impedance control direction is first set such that the voltage of the adjusting signal is increasing, and then, appropriateness of this control direction is determined depending on how the signal ratio changes as time passes. Consequently, the correct direction of voltage control can be determined promptly. It should be noted that the control direction temporarily set at the beginning of the frame is not necessarily the increasing direction, but may be set so as to decrease the control voltage of the adjusting signal.

The adjusting signal is acquired from the output of the time constant circuit 214 connected via the switch 212 to the constant voltage source 210. The opening and closing of the switch 212 is controlled based on the change over time in impedance mismatch Ve. The adjusting signal is obtained with this simple analog structure, without requiring a dedicated circuit. This is advantageous as compared with the conventional technique that requires a dedicated digital circuit. In addition, the structure illustrated in the above-described embodiment does not require a complicated control algorithm, such as the steepest descent method.

In addition, since the present invention does not require mathematical modeling of the voltage-capacitance characteristic or the voltage-inductance characteristic of the high-frequency variable element, non-linear variable elements can be employed. The voltage is controlled aiming at a further smaller impedance mismatch, and therefore, it is unnecessary to set an optimum value. In other words, the impedance can be adjusted without depending on the variable range of the capacitance of the high-frequency variable element. Furthermore, this simple control mechanism can be provided for each of multiple variable elements of the antenna matching circuit without imposing much workload on either software or hardware.

The present invention is not limited to the above-described embodiment, but there are many substitutions and modifications without departing from the scope of the invention. The present invention is applicable to any wireless device whose antenna impedance may vary depending on the environment and the state of use. The present invention can be applied not only to bidirectional wireless communication devices, but also to unidirectional wireless communication devices, such as devices used in keyless entry systems.

The present patent application is based on Japanese Priority Applications No. 2004-048127 filed Feb. 24, 2004, the entire contents of which are hereby incorporated by reference.

What is claimed is:

1. A control device for an antenna matching circuit, comprising a portion configured to output an adjusting signal for changing impedance of an element in the antenna matching circuit based on change over time in a signal power ratio of a reflected signal from the antenna matching circuit to an incident signal to the antenna matching circuit.

2. The control device of claim 1, wherein the control device outputs multiple adjusting signals for changing the impedances of multiple elements comprising the antenna matching circuit.

3. The control device of claim 1, wherein the adjusting signal is acquired from an output of a time constant circuit connected via a switch to a voltage source.

4. The control device of claim 3, wherein the switch is opened and closed based on the change over time in the signal power ratio.

5. The control device of claim 3, wherein the output of the time constant circuit is maintained constant for a prescribed period of time.

6. The control device of claim 3, wherein the output of the time constant circuit is fed back to an input of the time constant circuit for a prescribed period of time.

7. The control device of claim 1, wherein when the signal power ratio becomes smaller than a threshold level, a time constant of the time constant circuit is changed.

8. The control device of claim 1, wherein when the signal power ratio becomes smaller than a threshold level, measurement frequency of the change over time in the signal power ratio is varied.

9. The control device of claim 1, wherein when the signal power ratio becomes smaller than a threshold level, the impedance of the element in the antenna matching circuit is maintained substantially constant.

10. A control device for an antenna matching circuit, comprising: an impedance mismatch detector configured to detect impedance mismatch based on a signal power ratio of a reflected signal from the antenna matching circuit to an incident signal to the antenna matching circuit; and a control circuit configured to output an adjusting signal for changing impedance of an element in the antenna matching circuit based on change over time in the impedance mismatch.

11. The control device of claim 10, wherein the control device comprises two or more control circuits, each of the control circuits being configured to output the adjusting signal for changing the impedance of one of multiple elements constructing the antenna matching circuit.

12. The control device of claim 10, wherein the control circuit includes a time constant circuit connected via a switch to a voltage source and configured to output the adjusting signal.

13. The control device of claim 12, wherein the switch is opened and closed based on the change over time in the impedance mismatch.

14. The control device of claim 12, wherein the output of the time constant circuit is maintained constant for a prescribed period of time.

15. The control device of claim 12, wherein the output of the time constant circuit is fed back to an input of the time constant circuit for a prescribed period of time.

16. The control device of claim 10, wherein when the impedance mismatch becomes smaller than a threshold level, a time constant of the time constant circuit is changed.

17. The control device of claim 10, wherein when the impedance mismatch becomes smaller than a threshold level, impedance mismatch sampling frequency of the control circuit is changed.

18. The control device of claim 10, wherein when the impedance mismatch becomes smaller than a threshold level, the impedance of the element in the antenna matching circuit is maintained substantially constant.

19. A wireless communication apparatus comprising: an antenna matching circuit; and a controller configured to adjust an impedance of the antenna matching circuit, the controller outputting an adjusting signal for changing impedance of an element in the antenna matching circuit based on change over time in a signal power ratio of a reflected signal from the antenna matching circuit to an incident signal to the antenna matching circuit.

20. A control device for an antenna matching circuit, the control device being configured to output an adjusting signal for changing impedance of an element in the antenna matching circuit based on change over time in a signal power ratio of a reflected signal from the antenna matching circuit to an incident signal to the antenna matching circuit, wherein the antenna matching circuit includes two or more variable elements and the control device outputs multiple adjusting signals to change the impedances of the variable elements in series.

* * * * *